US010227054B2

(12) United States Patent
Diewald

(10) Patent No.: US 10,227,054 B2
(45) Date of Patent: Mar. 12, 2019

(54) RADAR SENSOR WITH FREQUENCY DEPENDENT BEAM STEERING

(71) Applicant: IEE International Electronics & Engineering S.A., Echternach (LU)

(72) Inventor: Andreas Diewald, Kell am See (DE)

(73) Assignee: IEE INTERNATIONAL ELECTRONICS & ENGINEERING S.A, Echternach (LU)

( * ) Notice: Subject to any disclaimer, the term of this patent is extended or adjusted under 35 U.S.C. 154(b) by 275 days.

(21) Appl. No.: 15/103,296

(22) PCT Filed: Nov. 28, 2014

(86) PCT No.: PCT/EP2014/075978
§ 371 (c)(1),
(2) Date: Jun. 9, 2016

(87) PCT Pub. No.: WO2015/086346
PCT Pub. Date: Jun. 18, 2015

(65) Prior Publication Data
US 2016/0311388 A1 Oct. 27, 2016

(30) Foreign Application Priority Data
Dec. 10, 2013 (LU) .......................................... 92 331

(51) Int. Cl.
*G01S 13/56* (2006.01)
*B60R 21/015* (2006.01)
(Continued)

(52) U.S. Cl.
CPC ........ *B60R 21/01534* (2014.10); *G01S 7/414* (2013.01); *G01S 13/04* (2013.01);
(Continued)

(58) Field of Classification Search
CPC ........ B60R 21/01534; B60R 21/01512; B60R 21/0153; B60R 21/01532;
(Continued)

(56) References Cited

U.S. PATENT DOCUMENTS 3,710,281 A * 1/1973 Thomas .................. H01P 1/213
333/134
4,868,574 A * 9/1989 Raab ....................... G01S 13/66
342/81
(Continued)

FOREIGN PATENT DOCUMENTS

WO WO2004046752 A1 6/2004

OTHER PUBLICATIONS

International Search Report corresponding to International application No. PCT/EP2014/075978, dated Feb. 9, 2015, 4 pages.
(Continued)

*Primary Examiner* — Peter M Bythrow
(74) *Attorney, Agent, or Firm* — Reising Ethington P.C.

(57) ABSTRACT

A radar system with frequency scanning beam steering is described for in-vehicle occupant detection and classification for seat-belt reminder functionality (SBR) and airbag suppression. The system includes an antenna system for which the main lobe direction (azimuth angle ö) is changing mostly linearly over frequency, a RF electronic transceiver electronic with at least one transmit channel and one or multiple receive channels with two outputs (I/Q) per channel. The data acquisition and signal processing/interpretation are made by a microcontroller system.

8 Claims, 3 Drawing Sheets

(51) Int. Cl.
*G01S 13/88* (2006.01)
*G01S 13/04* (2006.01)
*G01S 13/42* (2006.01)
*H01Q 3/22* (2006.01)
*H01Q 1/32* (2006.01)
*G01S 7/41* (2006.01)

(52) U.S. Cl.
CPC ............ *G01S 13/426* (2013.01); *G01S 13/56* (2013.01); *G01S 13/88* (2013.01); *H01Q 1/3291* (2013.01); *H01Q 3/22* (2013.01)

(58) Field of Classification Search
CPC ... B60R 21/01536; G01S 13/04; G01S 13/52; G01S 13/56; H01Q 3/22
See application file for complete search history.

(56) References Cited

U.S. PATENT DOCUMENTS

| | | | | |
|---|---|---|---|---|
| 5,330,226 | A * | 7/1994 | Gentry | G01V 8/10 280/735 |
| 5,446,661 | A * | 8/1995 | Gioutsos | B60R 21/013 180/273 |
| 6,061,035 | A * | 5/2000 | Kinasewitz | H01Q 3/22 343/700 MS |
| 6,099,030 | A * | 8/2000 | Kraft | B60N 2/002 180/272 |
| 6,199,904 | B1 * | 3/2001 | Dosdall | B60R 21/01534 280/735 |
| 6,266,592 | B1 * | 7/2001 | Lemense | B60N 2/0276 180/271 |
| 6,462,701 | B1 * | 10/2002 | Finn | B60R 21/01516 280/735 |
| 7,196,629 | B2 * | 3/2007 | Ruoss | A61B 5/0507 280/734 |
| 7,315,002 | B2 * | 1/2008 | Hofbeck | G01G 19/4142 177/136 |
| 2002/0140215 | A1 * | 10/2002 | Breed | B60N 2/853 280/735 |
| 2003/0002738 | A1 * | 1/2003 | Cooper | G01S 17/36 382/199 |
| 2003/0184439 | A1 * | 10/2003 | Yasui | B60R 21/01534 340/556 |
| 2005/0073424 | A1 * | 4/2005 | Ruoss | A61B 5/0507 340/686.6 |
| 2005/0122223 | A1 * | 6/2005 | Jones | G08B 13/2491 340/573.1 |
| 2006/0044124 | A1 * | 3/2006 | Hofbeck | B60R 25/20 340/438 |
| 2006/0180377 | A1 * | 8/2006 | Hofbeck | B60R 21/01534 180/271 |
| 2007/0152871 | A1 * | 7/2007 | Puglia | G01S 7/352 342/70 |
| 2010/0214150 | A1 * | 8/2010 | Lovberg | G01K 11/006 342/22 |
| 2012/0143786 | A1 | 7/2012 | Karner | |
| 2013/0016001 | A1 * | 1/2013 | Schoeberl | G01S 7/03 342/129 |
| 2013/0120204 | A1 * | 5/2013 | Schoeberl | H01Q 1/3233 343/772 |

OTHER PUBLICATIONS

Written Opinion corresponding to International application No. PCT/EP2014/075978, dated Feb. 9, 2015, 6 pages.

* cited by examiner

RADAR SENSOR WITH FREQUENCY DEPENDENT BEAM STEERING

TECHNICAL FIELD

The present invention generally relates to the technical field of radar sensors for occupancy detection e.g. in a vehicle and more specifically to a radar sensor with frequency dependent beam steering for occupancy detection (OD) or occupancy classification (OC) or seat-belt reminder (SBR) functionality.

BACKGROUND ART

State of the art for occupant classification and detection are foil based pressure sensor systems which are integrated in every single seat. The integration of foil sensors in each individual seat results in relatively high integration costs. Furthermore the wiring of the foil based pressure sensors causes problems especially in case of removable vehicle seats. Finally conventional foil based systems can only detect if people are sitting directly on the seat. Out-of-position cases (like sitting between two seats or sleeping on the rear bench) cannot be detected.

Radar based in-vehicle systems have not been established on the market due to high costs. In general each single seat needs a separate radar sensor.

On the other hand radar technology offers some advantages in comparison to other occupancy detection and classification methods. It is a contactless and invisible measurement system which can easily be integrated behind plastic covers and textiles. Radar systems can measure smallest motions within the range of micrometers. Existing state of the art solutions use a conventional single frequency Doppler radar as a motion sensor. This is not sufficient in order to get a reliable statement about the occupancy state and if the human is in or outside the car.

Technical Problem

It is an object of the present invention to provide an improved radar sensor for occupancy detection. The object is achieved by the invention as claimed in claim 1.

General Description of the Invention

In a possible embodiment of the invention, a vehicle occupancy detection and/or classification system comprises a radar system with frequency scanning beam steering. The vehicle occupancy detection and/or classification system may be used e.g. for seat-belt reminder functionality (SBR) and/or for in the control of secondary restraint systems such as airbags. The radar system may include an antenna system for which the main lobe direction (azimuth angle $\varphi$) is changing, preferably mostly linearly, over frequency, a RF electronic transceiver electronic with at least one transmit channel and one or multiple receive channels with two outputs (I/Q) per channel. The data acquisition and signal processing/interpretation are made by a microcontroller system.

The radar system may use an antenna with frequency dependent radiation directions (e.g. a kind of a leaky wave antenna or meta material antenna), so that the antenna can sense into different directions. By observing the motion in the pure Continuous Wave (CW) signal the angle of motion maximum can be determined. By use of an advanced auto-calibration method the motion can be extracted and classified. This allows distinguishing between objects with arbitrary motions (due to driving situations) and humans/animals inhering a breathing motion of the chest. By scanning over the surface of the human/animal and interpreting the reflected motion signal the size of the human can be estimated which further allows a classification of the occupant.

Such a system may detect and separate multiple occupants in the car by determining the position of the occupants. Conventional angle-of-arrival based systems are not able to separate objects which are close to each other (e.g. the occupants sitting side-by-side). Actual radar based occupant classification systems are using separate radar systems for every single seat (spatial separation by antenna lobes, MIMO/MISO radars) which yields high integration cost and material costs due to multiple channel electronics.

It will be appreciated that the main advantages of the proposed radar sensor are as follows:
- A single radar sensor (one single RF channel with I/Q output) may be used for detecting and/or classifying occupancy for the entire rear bench of the vehicle
- Excellent cost efficiency related to integration and material costs (also in comparison to conventional radar systems)
- Vital sign monitoring as an additional functionality for free It should further be noted that the radar sensor according to the present invention may be advantageously combined with optical sensor systems in order to validate the results of the detection and/or classification. In such a combined system the classification of an occupant may be determined by the radar sensor and subsequently validated by means of the optical system.

It will be noted that while the present invention is described in the context of seat belt reminder sensors or occupancy classification sensors used in the control of secondary restraint systems, these application examples are cited only as possible applications of the radar detection system. The skilled person will appreciate that the proposed detection system is not limited to these applications.

In a preferred embodiment of the invention, an occupancy detection and/or classification system for an automotive vehicle comprises at least one radar module for detecting the presence of an object within the vehicle interior, said at least one radar module comprising an antenna system having a frequency dependent main lobe direction, wherein said occupancy detection and/or classification system comprises a control module for operating said at least one radar module at a plurality of frequencies.

The antenna system is preferably arranged such that, in operation, said frequency dependent main lobe direction scans a number of vehicle seats, e.g. the seats of a rear seat bench, when said control module varies a frequency, at which said radar module is operated, across a range of said plurality of frequencies.

The antenna system may e.g. be arranged in one of a vehicle ceiling, a vehicle body pillar, a vehicle center console, a dash board or a vehicle steering wheel and directed towards the vehicle seats adjacent to the installation location.

The control module preferably comprises at least a RF electronic transceiver electronic with at least one transmit channel and one or multiple receive channels with two outputs (I/Q) per channel, whereas said antenna system comprises at least one of a travelling wave antenna (TWA), leaky wave antenna (LWA) or a series patch array (SPAs).

In a possible embodiment, the antenna system comprises at least two antennas, each of said at least two antennas having an individual frequency dependency of its main lobe direction, and wherein the respective individual frequency dependencies of the main lobe direction of said at least two antennas are different from one each other. Alternatively or additionally said antenna system comprises at least one antenna having first and second connection points arranged at opposite sides of said antenna, and wherein said control module is configured to operate said at least one antenna from both said first and second connection points.

Preferably the system further includes a static clutter module for filtering static scattering of radar radiation from non-moving objects.

BRIEF DESCRIPTION OF THE DRAWINGS

Preferred embodiments of the invention will now be described, by way of example, with reference to the accompanying drawings, which show.

DESCRIPTION OF PREFERRED EMBODIMENTS

Figure 1:
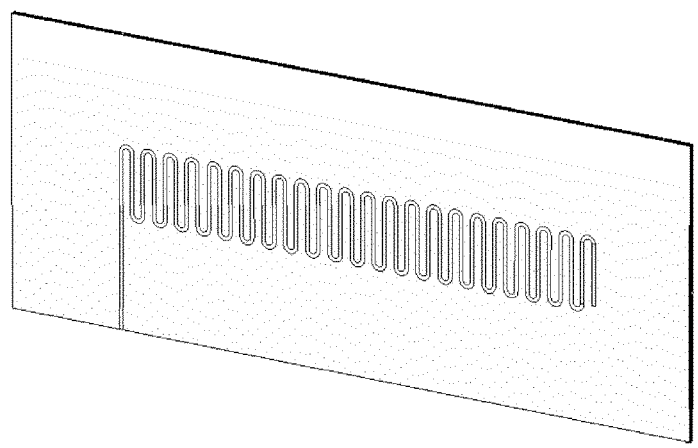
FIG. 1 shows a PCB with a meander microstrip line travelling wave antenna

Radar sensing within a complex environment like the interior of a car cabin is very challenging and the algorithm differs much from those for exterior radar sensing.

The advantage of radar systems is that in contrast to passive camera systems the radar system operates also in the night as it illuminates actively the scene. Active camera systems need an illumination in the light spectrum which can be visible for the human eye (compare to the glooming of infrared cameras). Radar systems are working in the microwave range which is completely invisible for the human eye. In addition it penetrates into materials and can transmit through. So the integration behind plastic covers and textiles as well is possible while camera based systems need an opening to look through.

Conventional Doppler radars (CW-radars) are very sensitive and able to track small target motions within the micrometer range due to the Doppler Effect. Those radar systems are often used for door openers, motion/presence detectors but also for vital sign monitoring of the breathing and the seismocardiographic motions of the skin. CW radars are radiating electromagnetic waves of only one single frequency so the range of the moving targets cannot be determined and multiple targets cannot be separated. Due to the sensitivity CW-radars are recording all motions in the antenna beam. In order to measure dedicated object motions the operator has to ensure, that the antenna beam is only pointed to the object and that no other moving objects are visible for the radar system. This is not ensured in the car interior where the antenna lobe can partially pointing outwards directly or via multiple reflections. So the range information needs to be determined to be able to distinguish if the motion signal is originated in the interior or the exterior of the car.

FMCW radars are in general able to determine the range of the targets due to a broadband frequency sweep for which the resolution improves with increasing bandwidth. The term resolution means here the minimal distance for which two targets can clearly be separated. For a FMCW radar working in the 24 GHz ISM band with a bandwidth of $\Delta f = 250$ MHz the range resolution $\Delta R$ is 60 cm calculated with the following equation ($c_0$ is the speed of light in free-space):

$$\Delta R = \frac{c_0}{2\Delta f}$$

In the car exterior the targets' range and velocity are determined by single measurements of one increasing and one decreasing frequency ramp, both linearly.

$$R = \frac{c_0 T_c (f_{b2} - f_{b1})}{4\Delta f}$$

$$v = \frac{c_0 (f_{b2} + f_{b1})}{4 f_0}$$

The measured frequencies (beat frequencies $f_{b1}$ and $f_{b2}$) are differing because the high targets velocities induce Doppler shifts oppositely during the increasing and decreasing ramps. The chirp time $T_c$ is the duration of one ramp.

The velocity resolution is $$\Delta v = \frac{c_0}{2 f_0 T_c}$$

With breathing velocities of 1-2 cm/s the minimum chirp time needs to be 30-60 s for which the velocity must be constant. Thus, the small breathing velocities cannot be measured with conventional FMCW algorithms.

On the other hand this allows us to assume the body position to be constant during a ramp measurement with duration of several milliseconds which is not true for fast moving targets like cars or even air planes. In the occupancy state monitoring there will be no significant Doppler shift during on ramp measurement.

Furthermore, the recording of the range values in a time series is not accurate enough due to the low range resolution and the static cluttering.

The only way to yield the small body motion signal is to get the targets phase out of the range domain in continuous FMCW mode or multiple-step FSK mode or to evaluate the phases of each measured frequency in FSK mode either. For both modes the static clutter must be removed before occupancy analysis.

The typical radar type may have nearly fixed and constant antenna lobes over the whole frequency range from 24.00 GHz up to 24.25 GHz, however the invention is not restricted to this frequency range. Other radar frequencies are for instance 60 GHz, 77 GHz, 79 GHz, 120 GHz or any other suitable radar frequency.

In the case of car interior occupancy state monitoring, several concepts are possible in order to distinguish between each single seat with multiple input-multiple output (MIMO) and multiple input-single output (MISO) systems:

Spatial separation between each single seat is reached by very narrow antenna lobes of every radar channel. There is mainly no interference between the single antennas. The main lobe is directly pointing on the middle of the seat.

The advantage of this concept is that all sensors can be integrated decentralized with arbitrary distances between the sensors (but the sensors should not face to each other).

Angle of arrival (AoA)/Direction of arrival (DoA): At least two or more antennas with broad radiation lobes. The antennas are printed on the same PCBs with a well-defined distance to each other. The targets have to be identified separately in each single channel (e.g. by distance and/or by motion velocity) and the azimuthal direction is found by phase comparison.

This is only possible when the objects are well separated by distance or have different velocities (in the the best case homogenous and constant velocities). In the case of rear-bench SBR all occupants are located at similar distances from the radar sensor, shoulder to shoulder and the breathing signal is nearly similar to each other. This concept is only valid for a centralized version.

Monopulse radars which are working similar to radars based on the AoA principle but determine the direction by differences in the amplitude.

Beamsteering and Beamswitching radars where the radiation beam can be individually changed into different directions.

The last concept of Beamsteering/-switching allows for ranging (sending out broadband signals) in all available directions with only one sensor but which is in general much more complex than radar systems with fixed antenna lobes and more cost expensive.

In a multi-scattering environment the detection of occupants is not possible by "conventional ranging". The reflections from the A, B and C pillars, the roof, the seats, etc. are overlapping and result in a broad cluttering for which the separation of occupants is hardly possible. For this reason motion sensing (e.g. with a pure CW radar sensor) is a very stable method to track for occupants with radar systems. Thus, the detection/tracking is done by human body motion which is the breathing of the human. For this purpose the single frequency measurements (CW) are sufficient for observation of the human body motion.

Applying antennas which are changing the main radiation lobe over the frequency (e.g. such as travelling wave antennas (TWA), leaky wave antennas (LWA), series patch arrays (SPAs), etc.) allows for a very cost efficient beam steering as most radar transceiver semiconductor systems can controlled in frequency. A typical TWA can be a meander microstrip line as depicted in FIG. 1 or a slotted slotted hollow waveguide.

A CW radar sensor with frequency adjustment (e.g. a VCO input) can measure a multiple set of CW motion measurements in time division multiplex. The use of an antenna which changes the main lobe radiation direction with frequency (such as leaky wave antennas (LWAs) or meta-material antennas (MMAs)) allows measuring the motion signal from different directions. This can now be the range from the left to the right seat on the rear bench which offers the detection of people on intermediate seat positions.

Figure 2:
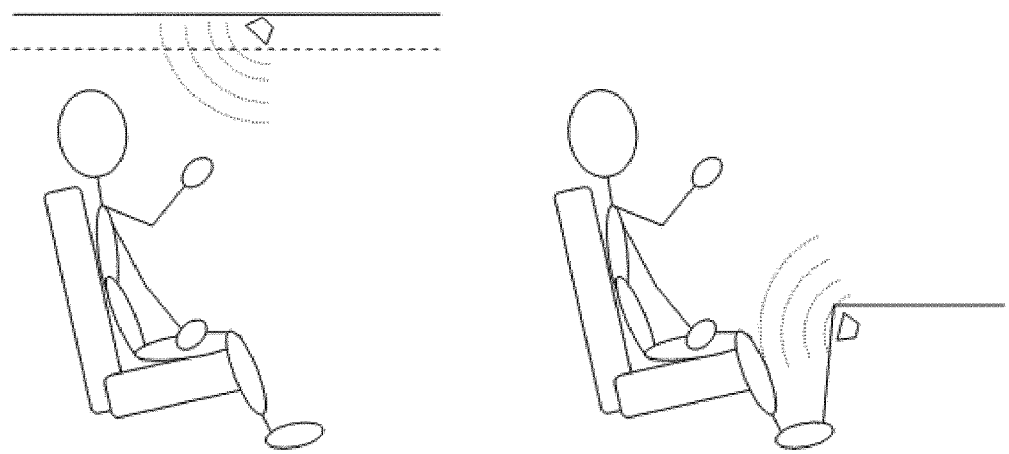
FIG. 2 shows a schematic of sensor positions within a passenger compartment of a vehicle FIG. 3 schematically illustrates the Steering of radiation lobe over a rear bench FIG. 4 schematically illustrates the concept of Doppler measurement with multi tone FSK modulation
Figure 3:
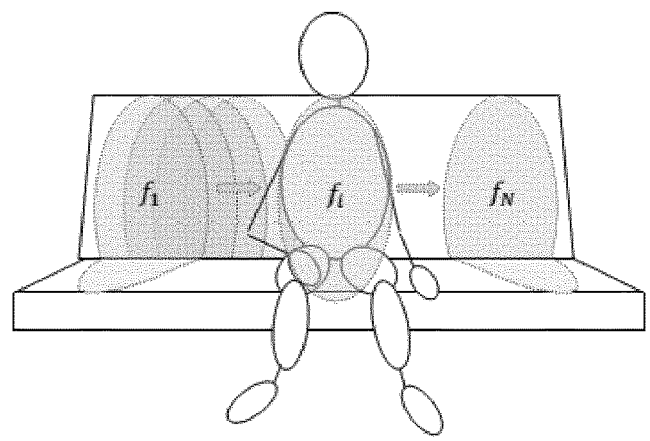

The position of sensor installation is in front of the occupant so that the whole area of the body or a part of it is illuminated. Possible integration places can be between top ceiling and car body, in the car body pillars, centre console, overhead console, dash boards, steering wheel etc. as depicted in FIG. 2. Thus, a single radar system on a centralized position can cover all seats e.g. a rear bench as depicted in FIG. 3.

Motion sensing (e.g. with a pure continuous wave (CW) radar sensor) is a very stable method to track for occupants with radar systems in multi cluttering and multipath environments. A pure CW radar sensor with only one single frequency is able to track a single target which is moving within a static environment. The amplitude of the Doppler signal is a quantity for the radar cross section (RCS) of the object. A multi-frequency measurement (e.g. multistep FSK) with a frequency steering antenna yields quasi-synchronous single CW measurements of different radiation angles addressed by the frequencies up to as indicated by FIG. 4.

Figure 4:
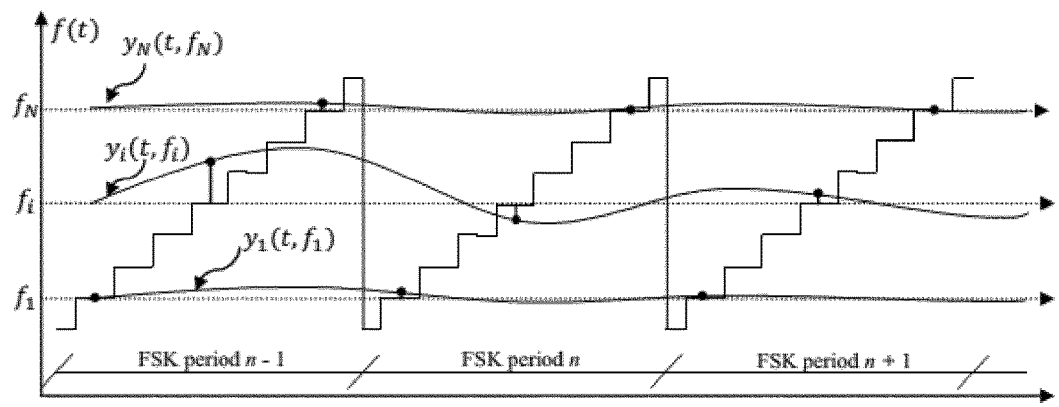

This can be interpreted as quasi-parallel measurement of the same target motions at the same time as outlined in FIG. 4.

The steps of the multi tone FSK frequency do not need to be in ascending or descending order but can be order arbitrary. The used frequency pattern should only be repetitive for equidistant Doppler motion measurement in time.

If the single object motion is slow enough in comparison to the sampling rate as it is the case for human motions like breathing or heart beat the Doppler signal at adjacent frequencies is nearly similar.

The static scattering of non-moving objects like e.g. pillars, car body roof, etc. which results in a DC offset in the baseband is filtered out and the signal processing can focus on the motion information of the single target. The static offset may e.g. be removed with one of the methods in the following:

1. Conventional band pass filtering with pass frequencies between some tens of milliHertz and several tens of Hertz
2. Estimation of the centroid of the signal in the complex domain for I/Q signals and in the one-dimensional real domain for one channel signals (only I)
3. Circle estimation method only for I/Q signals which forms a orthogonal set of signals (e.g. the method described by Izhak Butcher)
4. Taking the difference between two subsequent measurements
5. FFT of the complex I/Q signal or the pure real I signal Methods 1-5 rely on time series measurements and are always working in the complex domain. A good DC offset subtraction is only reached for the two first methods (1 & 2), when the target motion amplitude is in the range of a half wavelength, so that the base band signals are covering the full unambiguous range of the harmonic function (sine/cosine) and are completely rotating around in the complex domain. Method 3 needs implicitly a complex signal but the DC offset is estimated correctly only with a fraction of the circle on the complex domain. If not available the Hilbert transform to estimate a complex signal out of a pure real signal can offer a possible solution. Method 4 is the simplest one with an immediate response after two measurements without the need to take a whole set of measurements into account. The main drawbacks are the inaccuracy when motion signal frequency is of the same size as the sampling frequency and the sensitivity to noise. A FFT DC offset removal can work theoretically with one single measurement in the frequency domain, but here a FFT on the time series measurement of each single frequency is meant.

It will be noted that it is irrelevant, whether the static clutter removal is performed in the frequency domain or in the range domain. Both alternatives yield the same final result.

The distance of the moving target is not directly determined with this method. A small object in close proximity of the sensor and a large object further away with equal motion yield similar base band signals. In our case with a CW radar it cannot be determined if the signal results from motion in the interior or the exterior of the vehicle which is an issue when the antenna lobes are pointing out of the windows. For this reason the antenna should be designed only to focus on the backrest and/or the seating of the rear bench.

Figure 5:
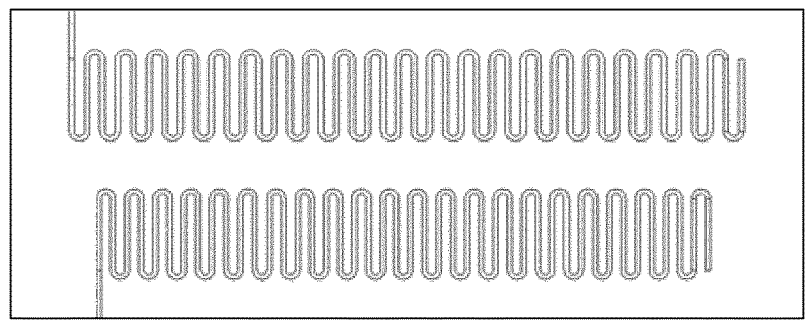
FIG. 5 shows a PCB with two different meander microstrip line travelling wave antennas

Another possibility is to spend two different frequency steering antennas with different control frequencies for same radiation angles (see FIG. 5). So, the object motion distance can be determined out of the phase difference between the tracked motion from both antenna systems.

Figure 6:
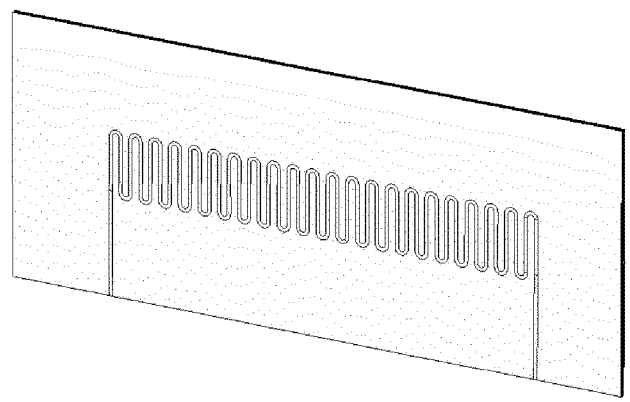
FIG. 6 shows a PCB with one single meander microstrip line travelling wave antenna fed from both sides FIG. 7 schematically shows a configuration of a radar system.
Figure 7:
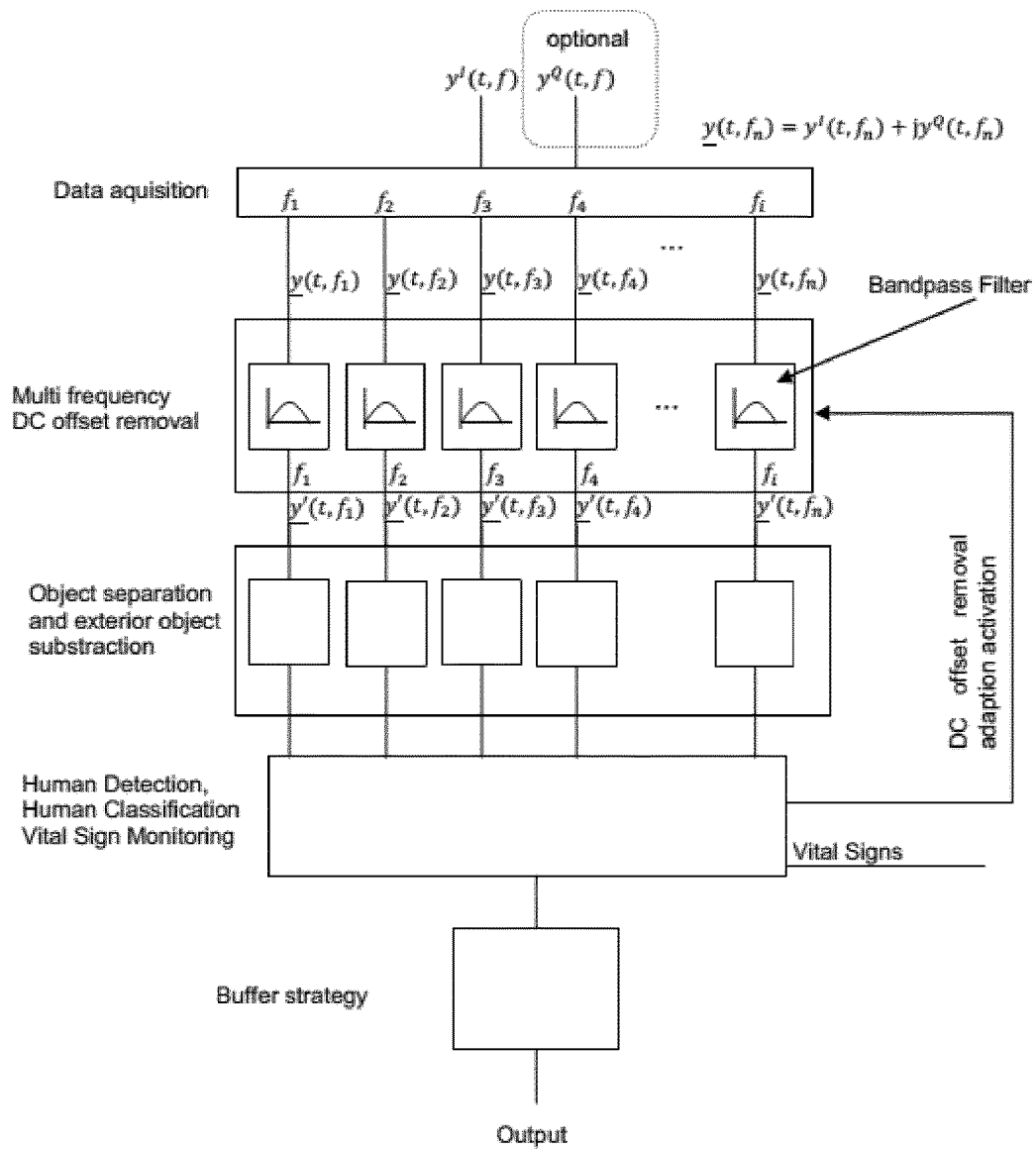

Instead of using different antennas one single antenna but feed from different sides can be applied as shown in FIG. 6.

Further problems arise when multiple targets are located in the field of view. When all objects are moving in the same manner the right motion will be detected correctly.

In the case that the motion of all multiple objects is homogeneous and the velocity differs clearly the targets can be separated too by a Fourier transform of time series measurements. Thus every target yields a separate Doppler shift in the frequency domain under the assumption of constant individual velocities. Approaching automotive vehicles or the exterior moving scene while driving around can clearly be separated from human occupants breathing.

Furthermore multiple targets with different inhomogeneous motions (e.g. several humans breathing or different parts of the human body) cannot clearly be separated with one single antenna system and if no a-priori data is available. Methods like "Blind Source Separation" and "Independent component analysis" are able to estimate different kind of arbitrary motions in CW mode for more than one frequency for which the output of two frequency dependent antennas (FIG. 5) or of one frequency antenna with two feeds (FIG. 6) is used. One single feed frequency dependent antenna (FIG. 1) can also be used with two adjacent frequencies for which the radiation spots are strongly overlapping so that there is a strong correlation between both signals which serves a good base for "Blind source separation" methods in order to be robust.

The invention claimed is:

1. An occupancy sensing system for an automotive vehicle, comprising at least one radar module for detecting the presence of an object within the vehicle interior, wherein said at least one radar module comprises an antenna system having a frequency dependent main lobe direction, wherein said occupancy sensing system comprises a control module for operating said at least one radar module at a plurality of frequencies, and wherein said occupancy sensing system is configured for determining occupancy, classification, or both, based on the motion of the object within the vehicle interior.

2. The occupancy sensing system according to claim 1, wherein said antenna system is arranged such that, in operation, said frequency dependent main lobe direction scans a number of vehicle seats when said control module varies a frequency, at which said radar module is operated, across a range of said plurality of frequencies.

3. The occupancy sensing system according to claim 1, wherein said antenna system is arranged in one of a vehicle ceiling, a vehicle body pillar, a vehicle center console, a dash board or a vehicle steering wheel.

4. The occupancy sensing system according to claim 1, wherein said control module comprises at least a RF electronic transceiver electronic with at least one transmit channel and one or multiple receive channels with two outputs (I/Q) per channel.

5. The occupancy sensing system according to claim 1, wherein said antenna system comprises at least one of a travelling wave antenna (TWA), leaky wave antenna (LWA) or a series patch array (SPAs).

6. The occupancy sensing system according to claim 1, wherein said antenna system comprises at least two antennas, each of said at least two antennas having an individual frequency dependency of its main lobe direction, and wherein the respective individual frequency dependencies of the main lobe direction of said at least two antennas are different from one each other.

7. The occupancy sensing system according to claim 1, wherein said antenna system comprises at least one antenna having first and second connection points arranged at opposite sides of said antenna, and wherein said control module is configured to operate said at least one antenna from both said first and second connection points.

8. The occupancy sensing system according to claim 1, wherein said system further includes a static clutter module for filtering static scattering of radar radiation from non-moving objects.

* * * * *